UNITED STATES PATENT OFFICE.

OTTO WOLFES AND HORST MAEDER, OF DARMSTADT, GERMANY.

PREPARATION OF TROPINONE MONOCARBOXYLIC-ACID ESTERS.

1,419,092.     Specification of Letters Patent.     Patented June 6, 1922.

No Drawing.     Application filed August 26, 1921. Serial No. 495,552.

*To all whom it may concern:*

Be it known that we, OTTO WOLFES, of Hoffmannstrasse 49, Darmstadt, and HORST MAEDER, of Wittmannstrasse 31, Darmstadt, Germany, both citizens of the Republic of Germany, have invented certain new and useful Improvements in or Relating to the Preparation of Tropinone Monocarboxylic-Acid Esters, (for which I have filed applications in Germany August 23, 1919; Holland October 14, 1920; Norway October 14, 1920; Switzerland October 14, 1920; Spain October 19, 1920; Austria October 20, 1920; Hungary October 25, 1920; Japan February 9, 1920; Sweden October 26, 1920; Denmark October 26, 1920; France October 27, 1920; Czecho-Slovakia November 3, 1920; England November 16, 1920; Italy December 16, 1920, and Belgium, December 26, 1920), of which the following is a clear, full, and exact description.

The object of this invention are tropinone mono-carboxylic acid esters, unknown products, and the process of preparing these products.

In the Journal of the Chemical Society of London, vol. 111/112 (1917), page 762 and following, it has been shown that by condensation of succinic dialdehyde with methylamine and aceton di-carboxylic acid, or their di-ethyl esters, a sevenfold cyclic system is produced which can easily be converted into tropinone. A way of arriving at the technical important tropinone mono-carboxylic acid is however not described there. With acetone the reaction supplies only a bad yield.

According to this reaction we have discovered that the esters of acetone mono-carboxylic acid (acetoacetic ester) can be easily condensed with methylamine and succinic dialdehyde according to the following reaction diagram:

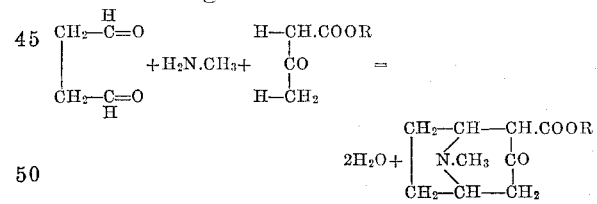

which can be converted into ecgonine.

*Example.*—17 parts of succinic di-aldehyde are dissolved in about 10 times the amount of water and are added to a solution of a mixture of 40 parts of acetoacetic esters with 24 parts alkali and 12 parts methylamine, in 200 parts of water, the solution at the same time being stirred and thoroughly cooled.

After 5 hours the alkaline solution is further shaken with chloroform, with the addition of potassium carbonate. The basic products are extracted from the chloroform by dilute sulphuric acid, and are recovered from the acid solution by the addition of soda and by shaking with fresh chloroform. The base is obtained as an oil, which on being left to stand in the air gradually solidifies. The yield amounts to about 20%.

Having now described our invention, we declare that what we claim as new and desire to secure by Letters Patent is:—

1. The process of preparing tropinone mono-carboxylic acid esters by condensing succinic di-aldehyde with aceto-acetic esters and methylamine.

2. The process of preparing a tropinone mono-carboxylic acid ethyl ester by condensing succinic di-aldehyde with aceto-acetic ethyl ester and methylamine.

3. As new products of manufacture tropinone mono-carboxylic acid esters by condensing succinic di-aldehyde with aceto-acetic esters and methylamine.

4. As a new product of manufacture a tropinone mono-carboxylic acid ethyl ester by condensing succinic di-aldehyde with aceto-acetic ethyl ester.

In testimony whereof we have hereunto signed our names in the presence of the two subscribing witnesses.

DR. OTTO WOLFES.
DR. HORST MAEDER.

Witnesses:
AENNE DICK,
RUST TEBALAN.